United States Patent
Olive et al.

(10) Patent No.: US 10,819,418 B2
(45) Date of Patent: Oct. 27, 2020

(54) SYSTEMS AND METHODS FOR SECURE COMMUNICATIONS OVER BROADBAND DATALINKS

(71) Applicant: Honeywell International Inc., Morris Plains, NJ (US)

(72) Inventors: Michael L. Olive, Cockeysville, MD (US); Daniel P. Johnson, Fridley, MN (US); Thomas D. Judd, Woodinville, WA (US)

(73) Assignee: Honeywell International Inc., Charlotte, NC (US)

( * ) Notice: Subject to any disclaimer, the term of this patent is extended or adjusted under 35 U.S.C. 154(b) by 232 days.

(21) Appl. No.: 15/498,415

(22) Filed: Apr. 26, 2017

(65) Prior Publication Data

US 2017/0317975 A1 Nov. 2, 2017

Related U.S. Application Data

(60) Provisional application No. 62/329,728, filed on Apr. 29, 2016.

(51) Int. Cl.
*H04L 29/06* (2006.01)
*H04B 7/185* (2006.01)
(Continued)

(52) U.S. Cl.
CPC ....... *H04B 7/18506* (2013.01); *H04L 1/0061* (2013.01); *H04L 9/3247* (2013.01);
(Continued)

(58) Field of Classification Search
CPC . H04L 63/0227; H04L 1/0061; H04L 9/3247; H04L 12/2801; H04L 12/4633;
(Continued)

(56) References Cited

U.S. PATENT DOCUMENTS 4,874,942 A  10/1989 Clauser
4,992,656 A   2/1991 Clauser
(Continued)

FOREIGN PATENT DOCUMENTS

EP        1463265          9/2004
EP        1463265 A2 *     9/2004  ............. H04L 29/06
WO    2017147207 A1        8/2017

OTHER PUBLICATIONS

Michael Olive; "ACARS Message Security (AMS) as a Vehicle for Validation of ICAO Doc. 9880 Part IV-B Security Requirements;" Jun. 2009; pp. 1-12; Publisher: Honeywell (Year: 2009).*
(Continued)

*Primary Examiner* — Jason Chiang
(74) *Attorney, Agent, or Firm* — Fogg & Powers LLC (57) ABSTRACT

Systems and methods for secure communications over broadband datalinks are provided. In certain implementations, a system for providing secure communications through a communication link includes a first communication unit that includes a processing unit that is configured to execute code that causes the first communication unit to verify messages with a firewall as they are received by the first communication unit; remove encapsulation data that encapsulates a message received from a second communication unit; check a digital signature appended to the message received from a second communication unit through a non-secure communication link; perform an integrity check on the message; and when the message is verified through the digital signature and the integrity check, process the message; wherein removal of the encapsulation data and implementation of the firewall is in a first partition and performance of the integrity check and verification of the digital signature is in a second partition.

18 Claims, 8 Drawing Sheets

(51) Int. Cl.
| | | |
|---|---|---|
| H04W 12/10 | (2009.01) | |
| H04L 29/08 | (2006.01) | |
| H04L 1/00 | (2006.01) | |
| H04W 12/08 | (2009.01) | |
| H04L 9/32 | (2006.01) | |
| H04L 12/28 | (2006.01) | |
| H04L 12/46 | (2006.01) | |
| G08G 5/00 | (2006.01) | |
| H04W 84/06 | (2009.01) | |

(52) U.S. Cl.
CPC ...... *H04L 12/2801* (2013.01); *H04L 12/4633* (2013.01); *H04L 63/0227* (2013.01); *H04L 63/0236* (2013.01); *H04L 63/123* (2013.01); *H04L 63/18* (2013.01); *H04L 67/12* (2013.01); *H04L 69/16* (2013.01); *H04L 69/321* (2013.01); *H04W 12/0808* (2019.01); *H04W 12/1006* (2019.01); *G08G 5/0013* (2013.01); *H04L 63/126* (2013.01); *H04W 84/06* (2013.01)

(58) Field of Classification Search
CPC ... H04L 63/0236; H04L 63/123; H04L 63/18; H04L 67/12; H04L 69/16; H04L 69/321; H04L 63/126; H04B 7/18506; G08G 5/0013; H04W 12/08; H04W 12/10; H04W 84/06
USPC .......................................................... 726/13
See application file for complete search history.

(56) References Cited

U.S. PATENT DOCUMENTS

| | | | | |
|---|---|---|---|---|
| 6,677,888 | B2 | 1/2004 | Roy | |
| 7,317,184 | B2 | 1/2008 | Kasevich et al. | |
| 7,437,756 | B2 * | 10/2008 | Bleumer | G06F 21/562 |
| | | | | 726/15 |
| 7,512,714 | B2 * | 3/2009 | Eckert | G06F 9/544 |
| | | | | 455/431 |
| 7,816,643 | B2 | 10/2010 | Hyodo | |
| 7,835,734 | B2 * | 11/2010 | Eckert | H04L 67/12 |
| | | | | 455/431 |
| 7,952,999 | B1 | 5/2011 | Jiang et al. | |
| 8,688,987 | B2 | 4/2014 | Kirk et al. | |
| 8,966,074 | B1 * | 2/2015 | Richards | H04L 47/10 |
| | | | | 709/224 |
| 9,134,450 | B2 | 9/2015 | Desruelle et al. | |
| 9,160,539 | B1 | 10/2015 | Juels et al. | |
| 9,215,228 | B1 | 12/2015 | Zhang et al. | |
| 9,294,340 | B1 * | 3/2016 | Logue | G06F 16/258 |
| 10,219,154 | B1 | 2/2019 | Hallock | |
| 10,321,310 | B1 | 6/2019 | Scheer et al. | |
| 2006/0080451 | A1 | 4/2006 | Eckert | |
| 2006/0130134 | A1 | 6/2006 | Colas | |
| 2006/0249666 | A1 | 11/2006 | Kasevich et al. | |
| 2007/0195775 | A1 * | 8/2007 | Glassoway | H04L 63/0245 |
| | | | | 370/392 |
| 2008/0005791 | A1 * | 1/2008 | Gupta | G06F 21/562 |
| | | | | 726/15 |
| 2008/0044014 | A1 | 2/2008 | Corndorf | |
| 2008/0044025 | A1 | 2/2008 | Corndorf | |
| 2008/0046039 | A1 | 2/2008 | Corndorf | |
| 2008/0073494 | A1 | 3/2008 | Hyodo | |
| 2009/0006926 | A1 * | 1/2009 | Koppelaar | H03M 13/09 |
| | | | | 714/762 |
| 2010/0037311 | A1 * | 2/2010 | He | H04L 63/0209 |
| | | | | 726/15 |
| 2010/0199086 | A1 * | 8/2010 | Kuang | H04L 63/0869 |
| | | | | 713/155 |
| 2010/0262715 | A1 * | 10/2010 | Tamalet | H04L 67/16 |
| | | | | 709/238 |
| 2011/0255506 | A1 * | 10/2011 | Toth | H04B 7/18506 |
| | | | | 370/331 |
| 2012/0177198 | A1 | 7/2012 | Cabos | |
| 2012/0210783 | A1 | 8/2012 | Carroll et al. | |
| 2012/0216286 | A1 * | 8/2012 | Johnson | G06F 21/64 |
| | | | | 726/26 |
| 2012/0252493 | A1 | 10/2012 | Siddeley et al. | |
| 2013/0073672 | A1 | 3/2013 | Ayed | |
| 2014/0190254 | A1 | 7/2014 | Bouyer et al. | |
| 2014/0241523 | A1 | 8/2014 | Kobres et al. | |
| 2014/0365694 | A1 | 12/2014 | Bolton et al. | |
| 2015/0005989 | A1 * | 1/2015 | Beltrand | B64C 19/00 |
| | | | | 701/3 |
| 2015/0023183 | A1 | 1/2015 | Ilsar et al. | |
| 2015/0373154 | A1 | 12/2015 | Voigt et al. | |
| 2016/0072781 | A1 | 3/2016 | Zhang et al. | |
| 2016/0163202 | A1 * | 6/2016 | Marion | H04L 67/12 |
| | | | | 701/3 |
| 2016/0212099 | A1 | 7/2016 | Zou et al. | |
| 2016/0241389 | A1 | 8/2016 | Le Saint et al. | |
| 2016/0277545 | A1 * | 9/2016 | Kwak | H04W 4/06 |
| 2016/0315766 | A1 | 10/2016 | Ujiie et al. | |
| 2017/0046211 | A1 * | 2/2017 | Jayawardena | G06F 11/079 |
| 2017/0111692 | A1 * | 4/2017 | An | H04N 21/2381 |
| 2017/0134164 | A1 | 5/2017 | Haga et al. | |
| 2017/0295031 | A1 * | 10/2017 | Bush | H04L 43/08 |
| 2017/0303123 | A1 | 10/2017 | Villar | |
| 2018/0006819 | A1 | 1/2018 | Watanabe et al. | |
| 2018/0198846 | A1 | 7/2018 | Srinivasan et al. | |
| 2019/0095655 | A1 | 3/2019 | Krawczewicz et al. | |
| 2019/0222986 | A1 | 7/2019 | Aitken et al. | |
| 2019/0238638 | A1 | 8/2019 | Way et al. | |

OTHER PUBLICATIONS

Ken Pasco; "ACARS and Error Checking;" Dec. 6, 2015; pp. 1-11; Publisher: www.flight.org (Year: 2015).*
European Patent Office, "Extended European Search Report from EP Application No. 17168567.0 dated Jul. 26, 2017", "from Foreign Counterpart of U.S. Appl. No. 15/498,415", dated Jul. 26, 2017, pp. 1-13, Published in: EP.
Rushby, "Partitioning in Avionics Architectures: Requirements, Mechanisms,and Assurance", "Retrieved from the Internet: http://www.tc.faa.gov/its/worldpac/techrpt/ar99-58.pdf; retrieved on Jun. 9, 2010", Mar. 2000, pp. 1-68.
European Patent Office, "Communication pursuant to Article 94(3) from EP Application No. 17168567.0 dated May 17, 2019", from Foreign Counterpart to U.S. Appl. No. 15/498,415, pp. 1-6, Published: EP.
European Patent Office, "Communication pursuant to Article 94(3) from EP Application No. 17168567.0 dated Oct. 25, 2018", from Foreign Counterpart to U.S. Appl. No. 15/498,415, dated Oct. 25, 2018, pp. 1-5, Published: EP.
European Patent Office, "Extended European Search Report from EP Application No. 19172016.8 dated Jun. 4, 2019", from Foreign Counterpart to U.S. Appl. No. 15/970,521, pp. 1-11, Published: EP.
European Patent Office, "Extended European Search Report from EP Application No. 19172019.2 dated Jun. 3, 2019", from Foreign Counterpart to U.S. Appl. No. 15/970,522, pp. 1-11, Published: EP.
U.S. Patent and Trademark Office, "Notice of Allowance", U.S. Appl. No. 15/970,521, dated Mar. 19, 2020, pp. 1-31, Published: US.
European Patent Office, "Communication pursuant to Article 94(3) EPC from EP Application No. 19172016.8", from Foreign Counterpart to U.S. Appl. No. 15/970,521, dated Mar. 23, 2020, pp. 1-3, Published: EP.
Adams, "Securing ASCARS: Data Link in the Post-9/11 Environment", "Avionics Today", "http://www.aviationtoday.com/2006/06/01/securing-acars-data-link-in-the-post-911-environment/", Dated Jun. 1, 2006, Retrieved on Feb. 15, 2018, pp. 1-6, Publisher: Access Intelligence, LLC.
European Patent Office, "Communication Pursuant to Article 94(3) from EP Application No. 17168567.0, dated Feb. 13, 2018", "from Foreign Counterpart of U.S. Appl. No. 15/498,415", dated Feb. 13, 2018, pp. 1-5, Published in: EP.

(56) References Cited

OTHER PUBLICATIONS

Kremer et al, "Public-Key-Infastructures for Embedded Systems", "Security for Invisible Systems", pp. 24-27.

Mahmoud et al, "An Aeronautical Data Link Security Architecture Overview", "28th Digital Avionics Systems Conference Oct. 25-29, 2009, Orlando, US", "HAL Archives-ouvertes", "https://hal-enac.archives-ouvertes.fr/hal-01022165", Dated Sep. 9, 2014, pp. Cover, 4.A.4-1-4.A.4-14, Publisher: IEEE.

Olive, "ACARS Message Security (AMS) as a Vehicle for Validation of ICAO Doc. 9880 Part IV-B Security Requirements", Jun. 2-5, 2009, pp. 1-12, Publisher: Honeywell.

Olive, "Efficient Datalink Security in a Bandwidth-Limited Mobile Environment—An Overview of the Aeronautical Telecommunications Network (ATN) Security Concept", Dated 2001, pp. 9.E.2-1-9.E.2-10, Publisher: IEEE.

Olive, et al. "Systems and Methods for Encrypted Vehicle Data Service Exchanges" U.S. Appl. No. 15/970,522, filed May 3, 2018; pp. 1-41.

Olive; et al. "Systems and Methods for a Secure Subscription Based Vehicle Data Service"; U.S. Appl. No. 15/970,521, filed May 3, 2018; pp. 1-34.

Rodriguez-Flores et al, "Compact FPGA Hardware Architecture for Public Key Encryption in Embedded Devices", "PLOS ONE", "https://doi.org/10.1371/journal.pone.0190939", Dated Jan. 23, 2018, pp. 1-21, Publisher: 2018 Rodriguez-Flores et al.

Salisbury, "Protected ACARS (PACARS)", "Baltic Management Directorate, Aerospace Management Systems Division", CNS/ATM Conference 2011, Dated 2011, pp. 1-35, Publisher. The MITRE Corporation.

Smith, et al, "Economy Class Crypto: Exploring Weak Cipher Usage in Avionic Communications via ACARS", 21st International Conference on Financial Cryptography and Data Security, Malta, 2017, pp. 1-18.

Strohmeier, "University of Oxford, Kellogg College, Thesis, "Security in Next Generation Air Traffic Communication Networks"", Dated 2006, pp. 1-204.

U.S. Patent and Trademark Office, "Office Action", U.S. Appl. No. 15/970,522, dated Jul. 21, 2020, pp. 1 through 45, Published: US.

U.S. Patent and Trademark Office, "Restriction Requirement", U.S. Appl. No. 15/970,522, dated Jun. 15, 2020, pp. 1 through 6, Published: US.

U.S. Patent and Trademark Office, "Restriction Requirement", U.S. Appl. No. 15/970,522, Jun. 15, 2020, pp. 1-6, Published: U.S.

U.S. Patent and Trademark Office, "Office Action", U.S. Appl. No. 15/970,522, dated Jul. 21, 2020, pp. 1-45, Published: U.S.

\* cited by examiner

SYSTEMS AND METHODS FOR SECURE COMMUNICATIONS OVER BROADBAND DATALINKS

CROSS REFERENCE TO RELATED APPLICATIONS

This application claims the benefit of U.S. Provisional Patent Application Ser. No. 62/329,728, filed on Apr. 29, 2016, which is hereby incorporated by reference.

BACKGROUND

In certain implementations, users that are accustomed to using certain communication standards are interested in communicating over broadband internet protocol (IP) channels. For example, airline operators are interested in leveraging broadband IP-based datalinks, which are being installed for passenger communication, to support airline/flight operations communications. One exemplary instance where airline operators seek to use broadband IP, is aircraft communication addressing and reporting system (ACARS) messages. ACARS messages may be used for sending safety and operational messages and systems that participate in sending and receiving ACARS messages operate mainly in the aircraft domain. Further, ACARS messages, which are traditionally exchanged over aeronautical datalinks and routed through Datalink Service Providers (DSPs), are instead routed over more cost-effective, higher bandwidth broadband/IP-based datalink subnetworks. While such a broadband/IP datalink subnetwork system may provide the capability to send and receive ACARS messages, the passenger domain communications systems do not typically provide security protection/isolation between systems in different aircraft domains. In addition, the use by an Aircraft Domain communications management unit (which hosts the ACARS air/ground router) of Ethernet to access the internet protocol/baseband satellite communication (IP/BB SATCOM) network and the IP ground network, which is more open, is accessible to additional security threats.

SUMMARY

Systems and methods for secure communications over broadband datalinks are provided. In at least one implementation, a system for providing secure communications through a communication link includes a first communication unit, the first communication unit comprising at least one processing unit that is configured to execute code that causes the first communication unit to verify messages with a firewall as they are received by the first communication unit; remove encapsulation data that encapsulates a message received from a second communication unit; check a digital signature appended to the message received from a second communication unit through a non-secure communication link; perform an integrity check on the message; and when the message is verified through the digital signature and the integrity check, process the message; wherein removal of the encapsulation data and implementation of the firewall is in a first partition on the at least one processing unit and performance of the integrity check and verification of the digital signature is in a second partition on the at least one processing unit.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Systems and methods for secure communications over broadband datalinks are provided. In certain implementations, a system includes a packet filter firewall, which filters on source and destination IP addresses and transmission control protocol/user datagram protocol (TCP/UDP) ports. Also, the filter firewall may be incorporated into the same software partition as the network stack. In a further implementation, a digital signature, which is applied to uplink messages, is incorporated in a separate software partition that performs message format and CRC checking. Messages, as described herein, refer generally to information received from a third party. In the event that malicious data is able to pass through the firewall, the signature check control prevents the malicious data from reaching the application. In certain implementations, the digital signature may be created according to industry standards to facilitate a customer off the shelf (COTS) implementation. Alternatively, the digital signature may be created according to a proprietary implementation. In certain implementations, the digital signature is applied in the uplink direction, which may permit the authentication of the source of the uplink transmission by the entity receiving the uplink transmission. Also, the digital signature may be applied in the downlink direction, which may permit the authentication of the source of the downlink transmission by the entity receiving the downlink transmission. In certain implementations, the digital signature is applied in the uplink direction and not in the downlink direction, where the entity receiving uplink transmission may authenticate the source of the message using a public key certificate of the entity that transmitted the uplink transmission; this approach may reduce key management logistics and complexity since the entity receiving the uplink transmission may not require use of a private key.

In certain embodiments, operating systems ensure that resources in each partition are not allocated for use by other partitions (i.e., by providing time and space partitioning). An advantage of partitioning is to isolate potential attacks on the IP stack from the digital signature mechanism (e.g., threats to corrupting the signature check code via buffer overflows in the IP stack) such that there are two layers of protection. Further, a first communication unit may not accept incoming IP end-to-end connections rather than allowing connections to be initiated from the second communication unit. The solution may include performing CRC and message formatting checks, but in addition may also ensure that only "allowed" applications (address filtering) utilize this service.

Figure 1:
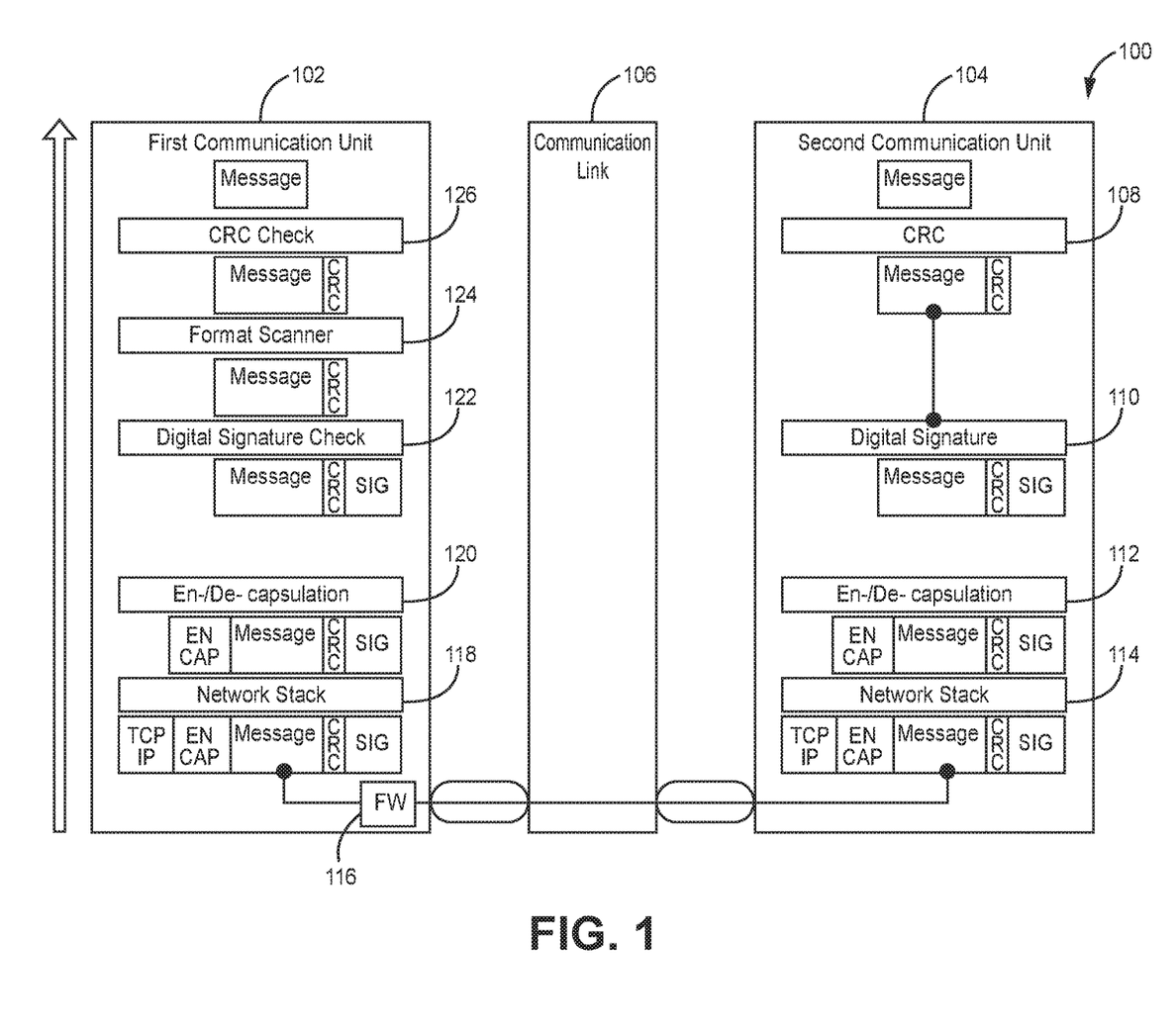
FIG. 1 is a block diagram illustrating secure communications between a first communication unit and a second communication unit over a communication link according to one implementation described herein.

FIG. 1 is a block diagram illustrating a first communication unit 102 and a second communication unit 104 that incorporate additional security measures to ensure that a message received by a first communication unit 102 over a communication link 106 was securely transmitted by the expected second communication unit 104. In certain implementations, the second communication unit 104 and the first communication unit 102 may be separated into different components or systems that communicate with each other and perform different portions of preparing messages for transmission to the first communication unit 102. For example, a second communication unit 104 may prepare a message for transmission to a first communication unit 102. Further the location of the first communication unit 102 and the second communication unit 104 may be on the ground, air, space, or a combination thereof.

In certain implementations, to prepare the message for transmission, the second communication unit 104 calculates a cyclical redundancy check (CRC) 108. In this document, CRC 108 may also mean other types of message integrity checks on the end to end message like a checksum (e.g., fletcher's checksum, and the like). When the CRC 108 is calculated, the second communication unit 104 may append the CRC 108 to the message for transmission. The CRC 108 may be calculated according to methods known to one having skill in the art. After appending the CRC 108 to the message, the second communication unit 104 also appends a digital signature 110 to the message. In certain implementations, the CRC 108 and digital signature 110 may be applied to a portion of a message, or to multiple messages. The digital signature 110 may be an identifier that identifies the second communication unit 104. The digital signature 110 may be calculated as known to one having skill in the art. When the digital signature 110 is appended to the message, the second communication unit 104 then encapsulates 112 the message for transmission according to a desired standard. Then a network stack 114 in the second communication unit 104 then further appends transmission control protocol/Internet protocol (TCP/IP) information for transmission over an IP network. As used herein, the term TCP may be interchangeable with the term UDP based on the knowledge of one having skill in the art. When the TCP/IP information is appended to the data to be transmitted, the second communication unit 104 transmits the data over an IP network 106 to the first communication unit 102.

In at least one embodiment, the IP network 106 may communicate signals as known to one having skill in the art. Further, the IP network 106 may be a commercially available IP network that is accessible to the general public for uses such as internet or public communications. As such, the IP network 106 lacks the desired security that is required by certain communications. To increase the security of the messages transmitted from the second communication unit 104 to the first communication unit 106, the second communication unit 104 added the CRC 108 and the digital signature 110 as described above. As illustrated, a TCP/IP network is used. However, any communication standard capable of providing a communication link 106 between the first communication unit 102 and the second communication unit 104 is applicable to embodiments described herein.

In certain embodiments, when the first communication unit 102 receives the transmission from the second communication unit 104, the first communication unit 102 may first check the message via a firewall 116. The firewall 116 may filter received messages based on source and destination IP addresses and TCP ports. In certain implementations, the firewall 116 may also perform message format checks. When a message passes the firewall 116 in the first communication unit 102, a network stack 118 may remove the TCP/IP information from the transmitted data. When the TCP/IP information is removed, the remaining data may be de-capsulated 120 according to the desired communication standard. When the data has been de-capsulated 120, the first communication unit 102 may then check that the data contains the appropriate digital signature 122. If the data contains the appropriate digital signature 122, the first communication unit 102 then may scan the format 124 of the message to ensure that it is correct. When scanning the format 124 of the message, the first communication unit 102 may ensure that the address of the message is for applications that are expecting to use the services performed by the first communication unit. For example, it may be determined that particular services may not be used for specific message types, so the addressing of the message coming over the particular service may not be allowed to be addressed for specific message types. When the message is not addressed to the specific message types the format scanner 124 may ensure that the message is not used by an application that is intended to receive messages with the specific message type. If the format of the message is correct, the first communication unit 102 then performs a CRC check 126 on the data. In at least one implementation, where a message may be segmented and the CRC may be applied to segments of the message. When, the CRC is applied to separate segments of the message, in contrast to being applied to the entire message, the CRC may be checked individually for the individual segments using techniques known to one having skill in the art. If the CRC check 126 determines that the CRC is correct, then the first communication unit 102 processes the message for the intended purpose of the message.

In further implementations, the different functions executed by the first communication unit 102 are performed within different software partitions to prevent the execution of one task from affecting the security of the messages during the execution of other tasks. For example, the firewall 116, the de-encapsulation 120 and the removal of TCP/IP information may be performed within a particular partition and the digital signature verification 122, format scanner 124, and the CRC check 126 may be performed within another partition providing greater security by preventing any malicious code that is being processed for the removal of the TCP/IP information from affecting the checking of the digital signature 122, format scanner 124, and the CRC check 126.

In at least one implementation, the first communication unit 102 performs the same tasks as the second communication unit 104 when preparing information for transmission to the second communication unit 104 through the IP network 106. For example, the first communication unit 102 may append a CRC 126, a digital signature 122, encapsulation 120, and TCP/IP data 118 before transmission through the IP network 106 to the second communication unit 104. Alternatively, the first communication unit 102 may perform only a portion of the information preparation when transmitting data to the second communication unit 104. For example, the first communication unit 102 may perform the tasks described above with the exception of appending the digital signature 122 to the information that is transmitted to the second communication unit 104.

Figure 2:
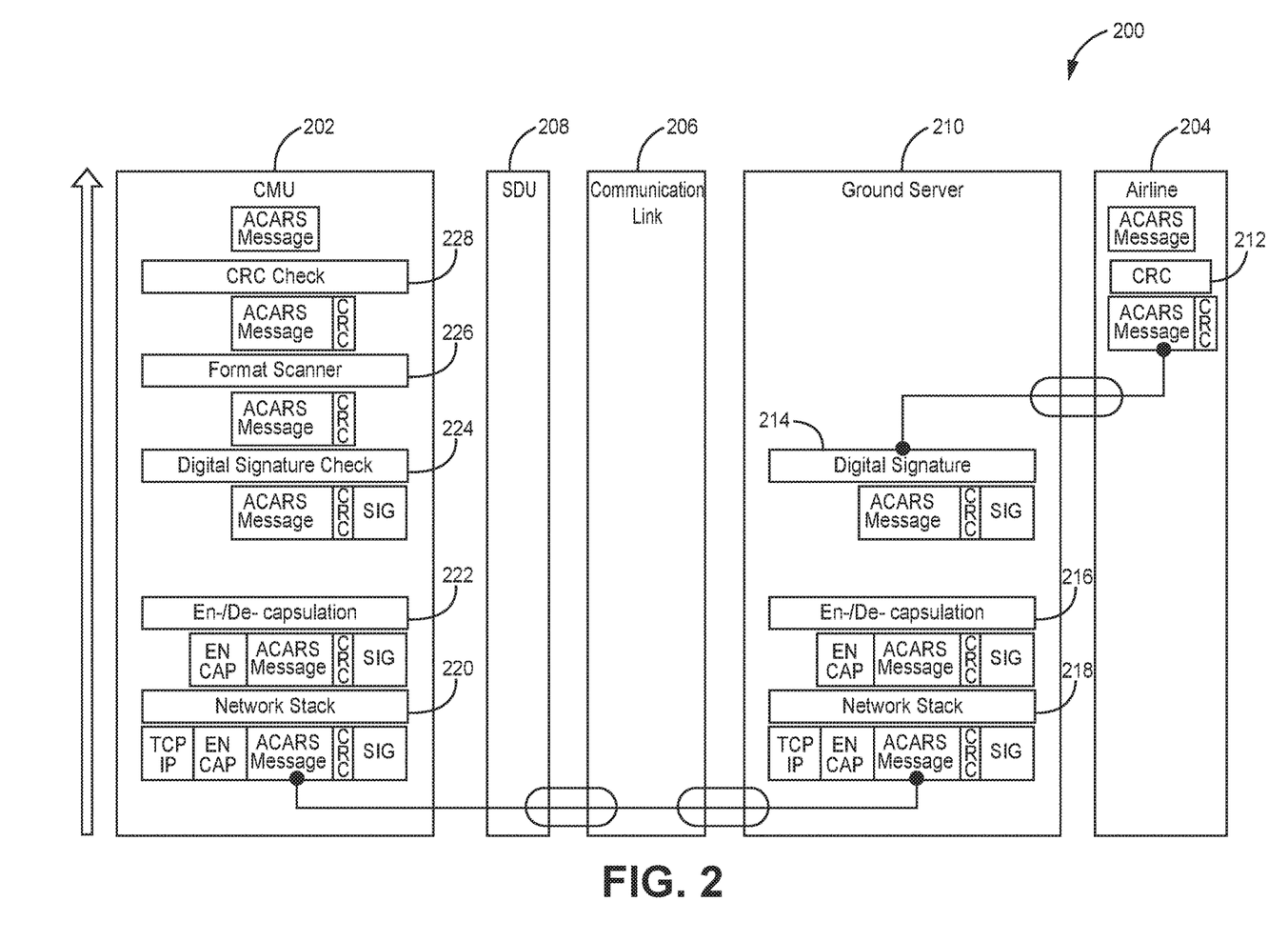
FIGS. 2-3 are block diagrams illustrating ACARS communications between a CMU and an airline over a communication link according to one implementation described herein.

FIG. 2 is a block diagram of a system 200 for communicating ACARS or other avionic type messages between an airline 204 and a communications management unit (CMU) 202 in an uplink direction. In at least one embodiment, the CMU 202 may be a communication management function (CMF) or an ATSU (Air Traffic Service Unit). FIG. 2 represents a specific implementation of the system described above with respect to FIG. 1. In particular, FIG. 2 illustrates an airline 204 and a ground server 210 that provide the functionality described above with respect to the second communication unit 104. For example, the airline 204 may be an airlines operation center, or other communication system owned by an airline for communication with aircraft belonging to the aircraft. Further, system 200 includes CMU 202 and a broadband SATCOM data unit (SDU) 208 that provide the functionality described above with respect to the first communication unit 102. In certain implementations, communications over the broadband satellite unit 208 may also transmitted through systems that include AeroMACS, Cell, Wifi, or other non-satellite IP-based communication links. As illustrated in FIG. 2, the airline 204 and the ground server 210 communicate with the CMU 202 and the SDU 208 through a communication link 206.

In certain embodiments, the communication link 206 may be a link that connects the SDU 208 to the ground server 210. In at least one exemplary implementation, the communication link 206 is part of an IP network. For example, the communication link 206 may be provided through the INMARSAT satellite network, IRIDIUM, WiFi, Cell, AeroMACS or other network capable of supporting IP communications or other data standards such as those used to support internet communications on vehicles.

When the airline 204 has a message, such as an ACARS message, to transmit to or via the CMU 202 on an aircraft, the airline or ground operations center may calculate the CRC 212 for the ACARS message and then append the CRC 212 to the ACARS message. When the CRC 212 is appended to the message, the message is then transmitted to the ground server 210. The ground server 210 then appends a digital signature 214 to the message, encapsulates 216 the message, and appends TCP/IP transmission information at a network stack 218. The ground server 210 then transmits the message to the SDU 208 through the communication link 206. When the SDU 208 receives the transmission, the SDU 208 then passes the transmission to the CMU 202. The CMU 202 then functions essentially as described in relation to the first communication unit 102 in FIG. 1. In at least one other implementation, both the ground server 210 and the CMU 202 include firewalls. In at least one implementation, when the CMU 202 receives the message, the CMU 202 removes the TCP/IP data from the transmitted message at the network stack 220, de-capsulates 222 the transmitted message, verifies that the digital signature 224 is correct, scans 226 the message for the correct format, and then verifies that the CRC 228 is correct. If the CRC 228 is correct, then the CMU 202 processes the message. In at least one implementation, the airline does not communicate with the aircraft until the aircraft has initiated a connection/session with the airline.

Figure 3:
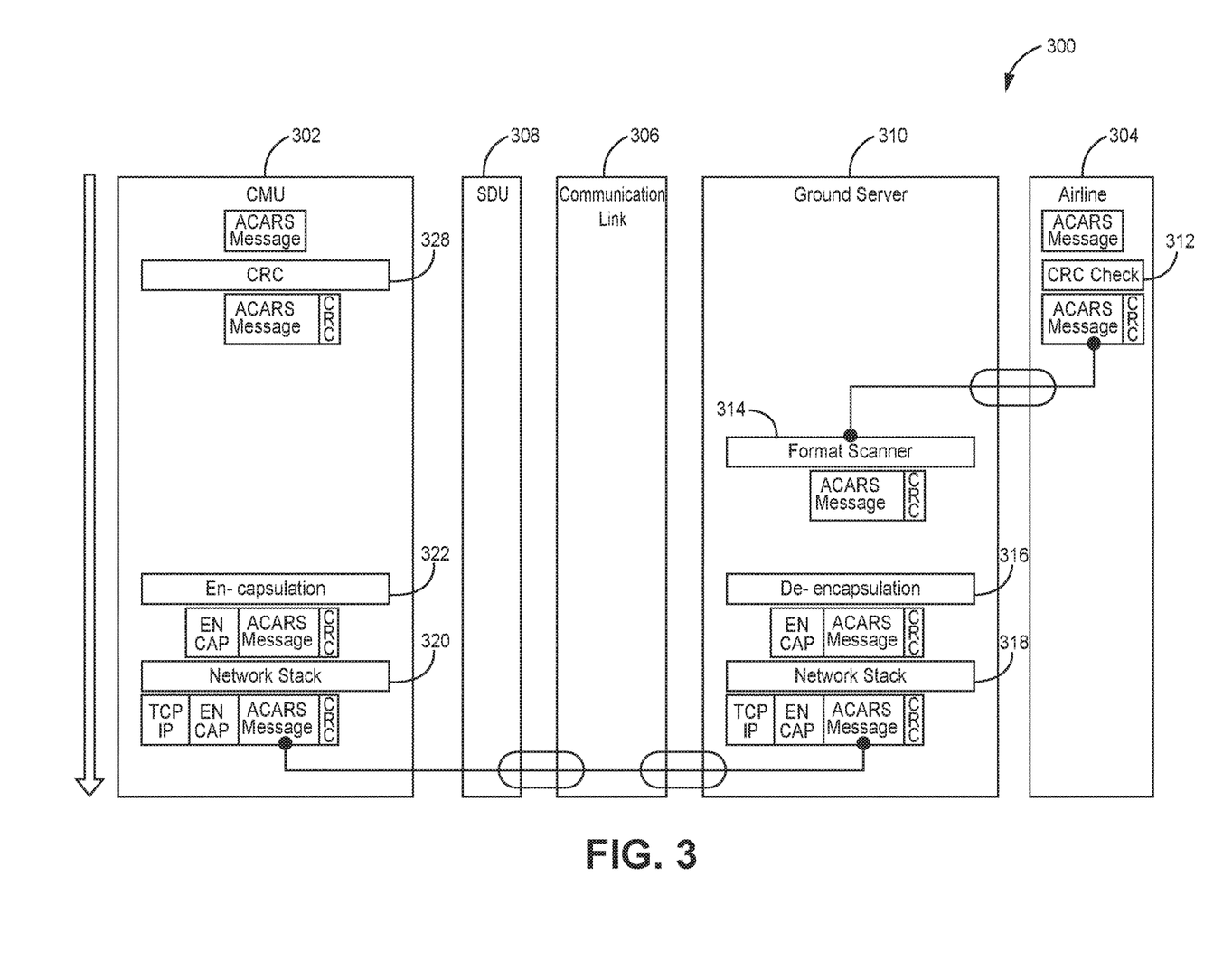

FIG. 3 is a block diagram of a system 300 for communicating ACARS or other avionic type messages between an airline 304 and a communications management unit (CMU) 302 in a downlink direction. In certain implementations, there may be less security protection for messages transmitted in the downlink direction as compared to messages transmitted in the uplink direction. Accordingly, FIG. 3 is similar to FIG. 2 with the exception that a digital signature is not appended to the ACARS message before encapsulation by the CMU 302. As a digital signature is not appended to the message before encapsulation by the CMU 302, the ground server 310 does not check for a digital signature on the received message.

In certain implementations, when transmitting a message from the CMU 302 to the airline 304, the CMU 302 produces an ACARS message. The CMU 302 then calculates a CRC 328 for appending to the ACARS message. When the CRC 328 is appended to the ACARS message the message and CRC 328 then have encapsulation 322 and TCP/IP information 320 respectively appended to the message. When the TCP/IP information is appended, the message is then transmitted to the SDU 308, which communicates the message through the communication link 306 to a ground server 310. The SDU 308, and the communication link 306 function much as described above with respect to SDU 208 and communication link 206 in FIG. 2. When the ground server 310 receives the transmission, the ground server 310 may remove the TCP/IP data 318 and de-capsulates 316 the message. When the message is de-capsulated, the ground server 310 may scan the format 314 of the message and then pass the message to the airline 304. When the airline 304 receives the message from the ground server 310, the airline 304 may perform a CRC check 312, if the CRC matches the message, the airline 304 uses the message for its intended purpose. In at least one implementation, the aircraft does not communicate with the airline until the aircraft has initiated a connection/session with the airline.

Figure 4:
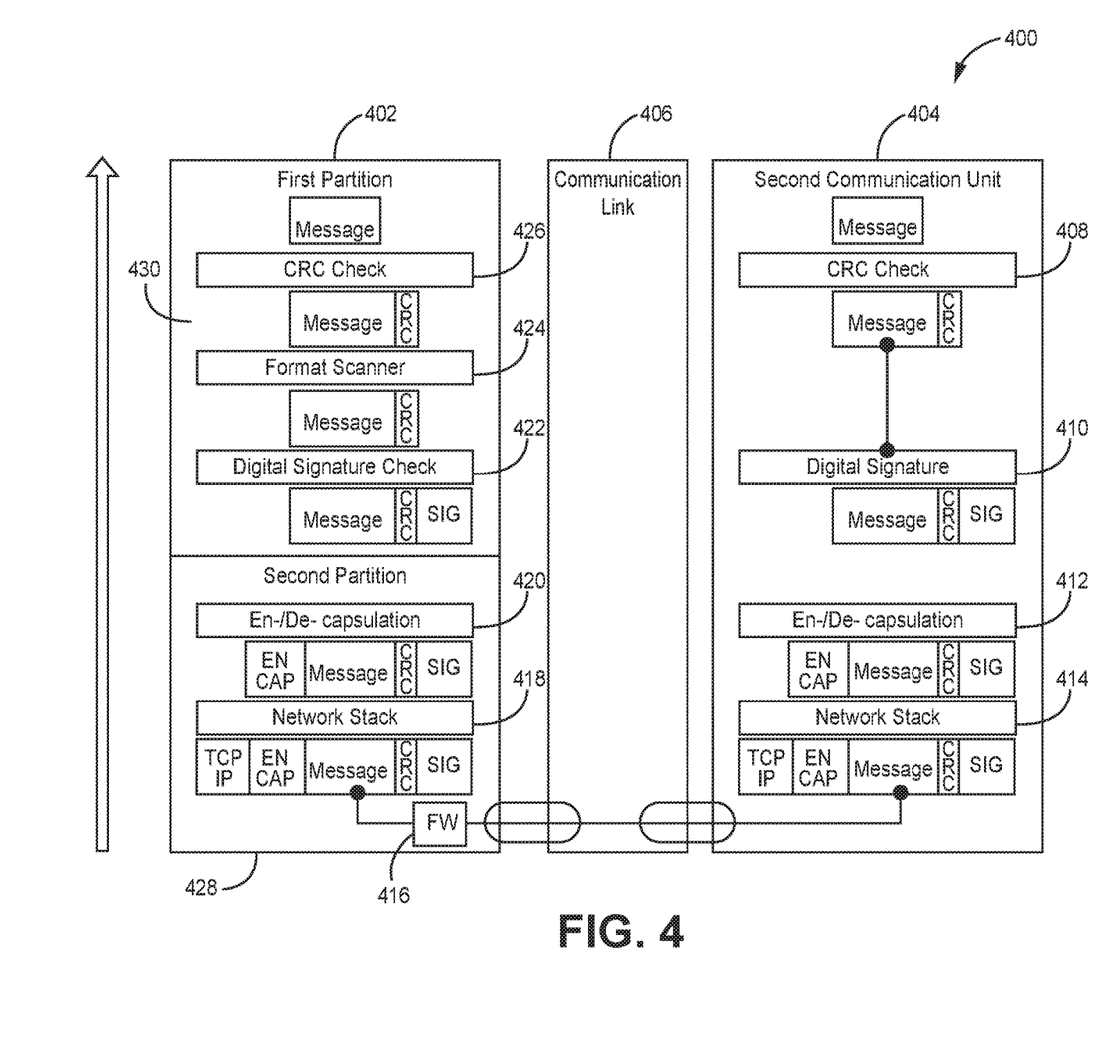
FIGS. 4-5 are block diagrams illustrating secure communications between a first communication unit and a second communication unit over a communication link according to one implementation described herein.

FIG. 4 is a block diagram of a system 400 for communicating ACARS or other types of messages between a second communication unit 404 and a first communication unit 402 in an uplink direction. In certain implementations, the second communication unit 404 may create a message and then prepare the message for transmission to the first communication unit 402. To prepare the message for transmission, the second communication unit 404 calculates a CRC 408 for the message, appends a digital signature 410, encapsulates the message 412, and prepares the message for transmission 414 through a communication link 406. When the message is transmitted to the first communication unit 402 from the second communication unit 404 through the communication link 406, the first communication unit 402 checks the received communication at a firewall 416 to determine that it came from the correct transmission source, removes the TCP/IP information 418, de-capsulates the message 420, identifies the digital signature 422, scans the format of the message 424, may check that the message is associated with a connection/session that is initiated by the first communication unit, and then checks that the CRC 426 for the received message is correct. If the CRC message is correct the first communication unit 402 processes the message for its intended purpose.

In certain implementations, the first communication unit 402 may perform the different checks within different software partitions. For example, as illustrated in FIG. 4, the first communication unit 402 has a first partition 430 and a second partition 428. Functionality related to the firewall 416, TCP/IP communications 418 and the encapsulation and de-capsulation 420 are all performed within the second partition 428. The CRC checking 426, format scanning 424, and digital signature checking 422 are performed within the first partition 430. The partitioning helps prevent malicious attacks that are received and initially processed within the second partition 428 from affecting the code that executes in the first partition 430. The first communication unit 402 may have any number of partitions, where each partition allows a task to execute such that malicious data processed by another task in another partition is isolated from affecting tasks that execute within other partitions. To execute the tasks within different partitions, the first communication unit 402 may be executing an operating system like DEOS or other operating system capable of executing the tasks within different partitions. In certain implementations of system 400, the first communication unit 402 may be implemented on board an aircraft and the second communication unit 404 may be implemented as a ground server.

Figure 5:
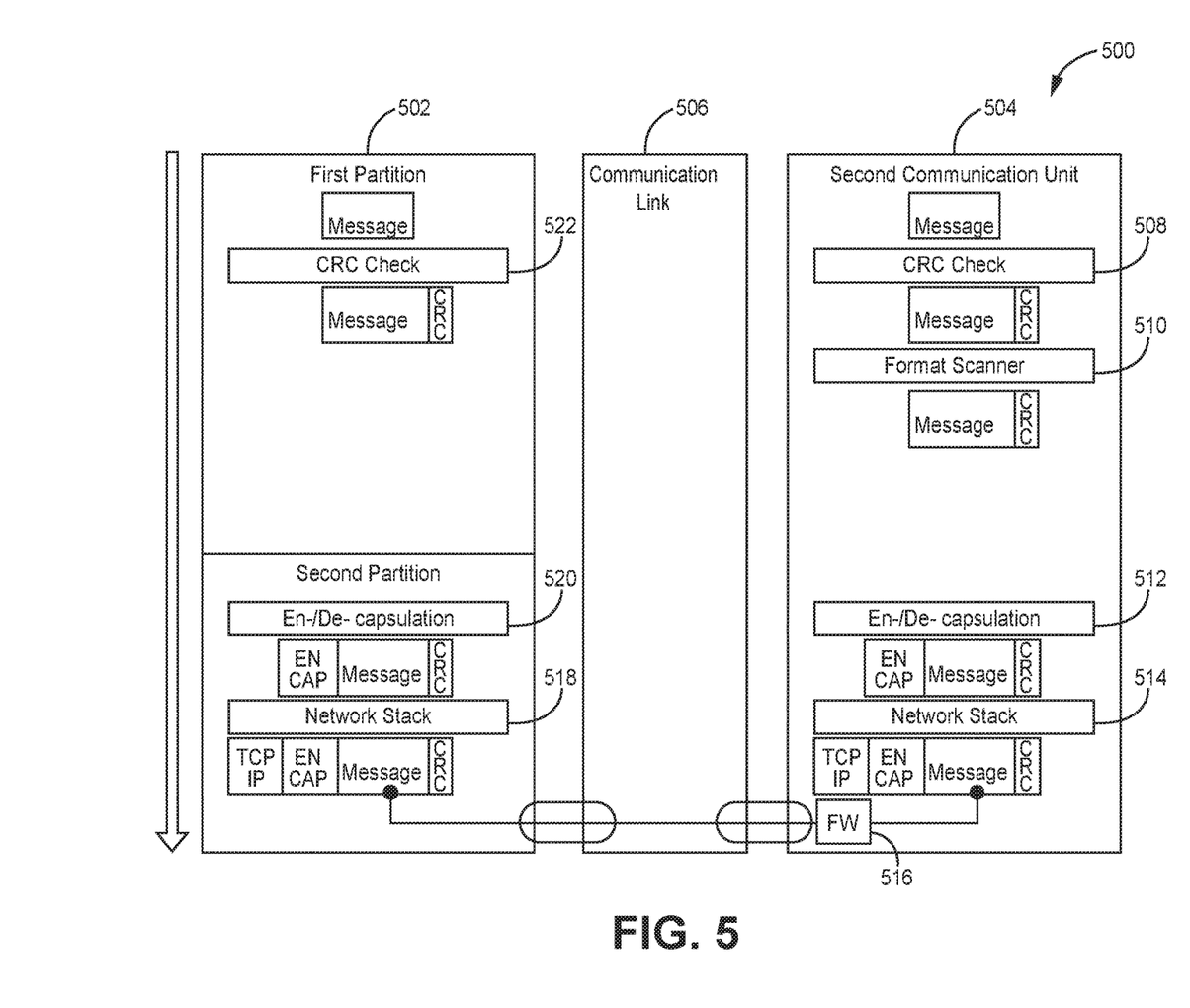

FIG. 5 is a block diagram of a system 500 for communicating messages between a second communication unit 504 and a first communication unit 502 in a downlink direction. The components of FIG. 5 are similar to the components of FIG. 4 with the exception that the first communication unit 502 is transmitting a message to a second communication unit 504. As shown, and similar to the example provided with respect to FIG. 3, a digital signature is not appended to the message before encapsulation by the first communication unit 502. As a digital signature is not appended to the message before encapsulation by the first communication unit 502, the second communication unit 504 does not check for a digital signature on the received message. However, the first communication unit 502 may append a digital signature to the message before encapsulation.

In certain implementations, when transmitting a message from the first communication unit 502 to the second communication unit 504, the first communication unit 502 produces a message. The first communication unit 502 then calculates a CRC 522 for appending to the message. When the CRC 522 is appended to the message the message and CRC 522 then have encapsulation 520 and TCP/IP information 518 respectively appended to the message. When the TCP/IP information is appended, the message is then transmitted to the second communication unit 504, where the message is transmitted through a communication link 506. The communication link 506 functions in a similar manner to that described above with respect to the communication link 406 in FIG. 4. When the second communication unit 504 receives the transmission, the second communication unit 504 may perform or bypass a firewall check 516, remove the TCP/IP data 514, and de-capsulate 512 the message. When the message is de-capsulated 512, the second communication unit 504 may scan the format 510 of the message and perform a CRC check 508, if the CRC matches the message, the second communication unit 504 uses the message for its intended purpose. In certain implementations of system 500, the first communication unit 502 may be implemented on board an aircraft and the second communication unit 504 may be implemented as a ground server.

Figure 6:
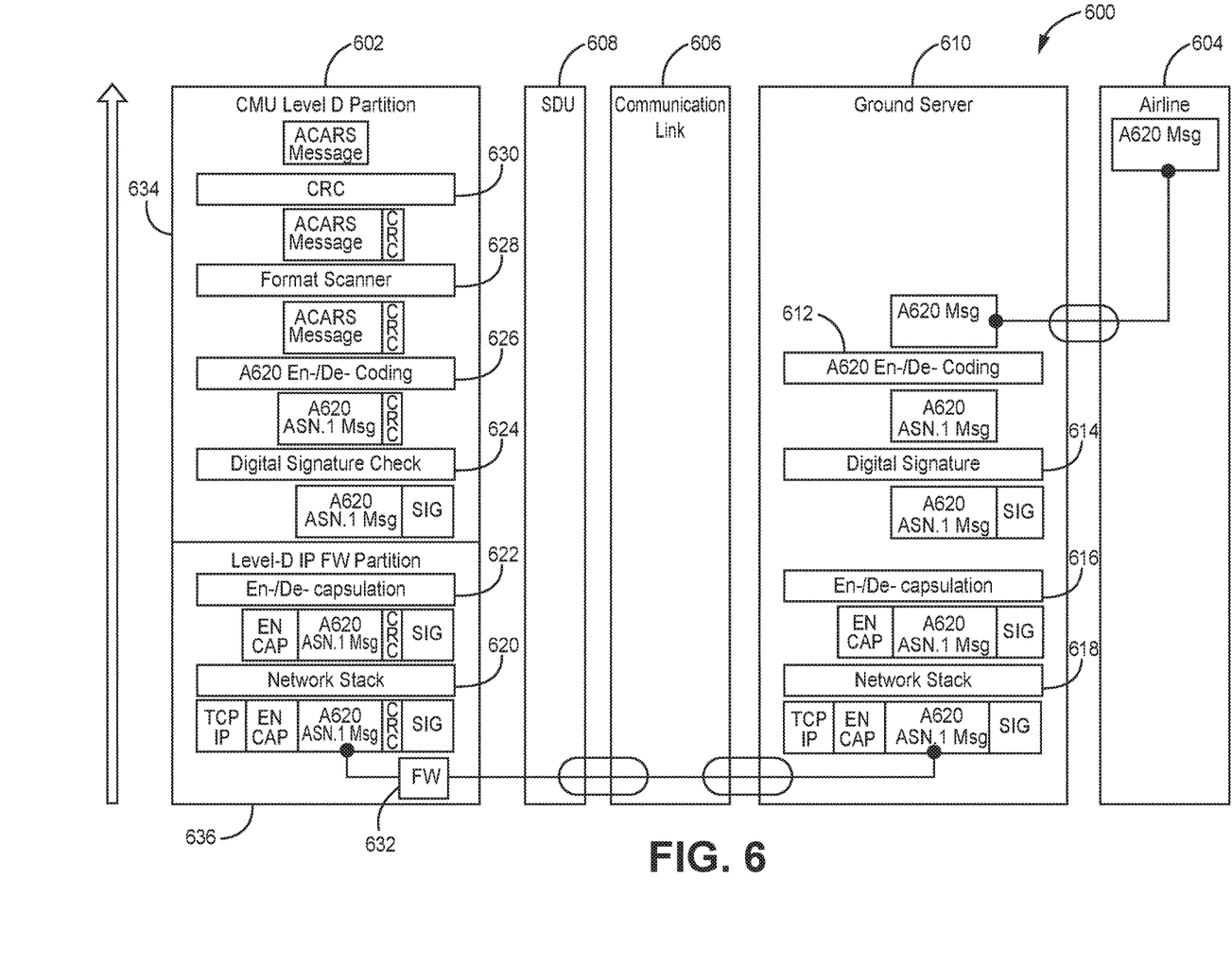
FIG. 6-7 are block diagrams illustrating A620 communications over a communication link according to one implementation described herein.

FIG. 6 is a block diagram of a system 600 illustrating an exemplary implementation of the system described above with respect to FIG. 4. As shown in FIG. 6, an A620 message is communicated between an airline 604 and a CMU 602 in an uplink direction. An A620 message is an example of a message formed according to an interface definition between a service provider and an airline operations center. In certain implementations, the ground server 610 may receive the A620 message from the airline 604 and then the ground server 610 may prepare the message for transmission to the CMU 602. To prepare the message for transmission, the ground server 610 may encode the message using A620 encoding 612, appends a digital signature 614, encapsulates the message 616, and prepares the message for transmission 618 through a communication link 606. When the message is transmitted to the CMU 602 from the ground server 610 through the communication link 606 and the SDU 608, the CMU 602 checks the received communication at a firewall 632 to determine that the message came from the correct transmitting unit, check the address of the message, check the application, check the policy, removes the TCP/IP information 620, de-capsulates the message 622, identifies the digital signature 624, decodes the A620 encoding 626, scans the format of the message 628, and then checks a CRC 630 for the received message. In certain implementations, the communication units may also verify that the message is for a connection/session initiated from the first communication system. If the CRC message is correct the CMU 602 processes the message for its intended purpose.

As illustrated, the CMU 602 may perform the different checks within different partitions. For example, as illustrated in FIG. 6, the CMU 602 has a CMU level D partition 634 and level D internet protocol/firewall (IP/FW) partition 636. Functionality related to the firewall 632, TCP/IP communications 620 and the encapsulation and de-capsulation 622 are all performed within the IP/FW partition 636. The CRC checking 630, format scanning 628, A620 decoding 626, and digital signature checking 624 are performed within the CMU level D partition 634. The CMU 602 may have any number of partitions, where each partition allows a task to execute such that malicious data processed by another task in another partition is isolated from affecting other's tasks.

Figure 7:
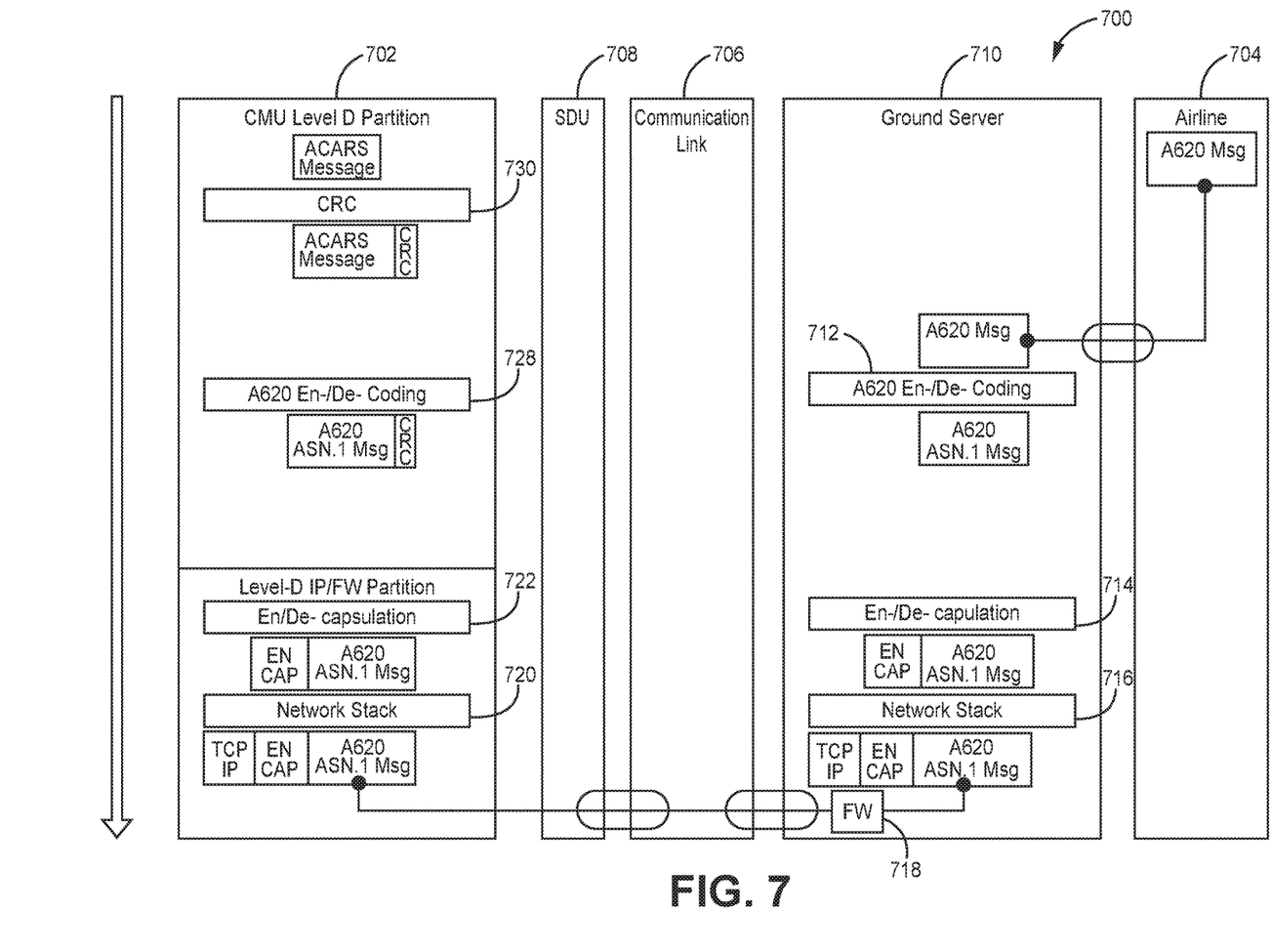

FIG. 7 is a block diagram of a system 700 for communicating A620 or other avionic type messages between an airline 704 and a communications management unit (CMU) 702 in a downlink direction. FIG. 7 illustrates at least one implementation of the system described in relation to FIG. 5. In the implementation related to FIG. 7, A620 messages are communicated between the CMU 702 and the ground server 710. In a similar manner to FIG. 5, a digital signature is not appended to the A620 message before encapsulation by the CMU 702. Further, the CMU 702 performs an A620 encoding 728 on the message before encapsulation 722 by the CMU 702. As a digital signature is not appended to the message before encapsulation by the CMU 702, the ground server 710 does not check for a digital signature on the received message. However, the CMU 702 may append a digital signature to the message before encapsulation.

In certain implementations, when transmitting a message from the CMU 702 to the airline 704, the CMU 702 produces an A620 message. The CMU 702 then calculates a CRC 730 for appending to the A618 message. When the CRC 730 is appended to the A620 message, the message and CRC are then encoded 728. Further, the message is encapsulated 722 and TCP/IP information 720 is appended to the message. When the TCP/IP information is appended, the message is then transmitted to the SDU 708, which communicates the message through the communication link 706 to a ground server 710. The SDU 708, and the communication link 706 function much as described above with respect to SDU 208 and communication link 206 in FIG. 2. When the ground server 710 receives the transmission, the ground server 710 may pass the message through a firewall 718, remove the TCP/IP data 716, and de-capsulate the message 714. When the message is de-capsulated, the ground server 710 may decode the A620 message 712 and then pass the message to the airline 704. When the airline 704 receives the message from the ground server 710, the airline 704 may use the message for its intended purpose.

Figure 8:
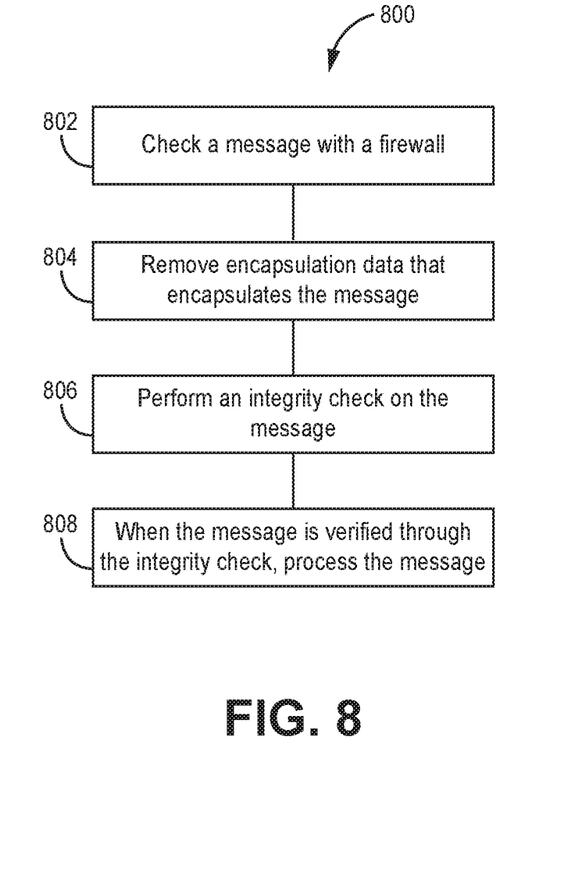
FIG. 8 is a flow diagram illustrating a method for receiving secure information over a data link in accordance with embodiments described herein.

FIG. 8 is a flow diagram of a method 800 for receiving secure communications through a communication link. In certain implementations, method 800 proceeds at 802 where a message is checked with a firewall. When the message is checked by the firewall, the firewall may filter the message based on the source and destination IP addresses and TCP ports. In certain implementations, the firewall 116 may also perform message format checks, address checks, application checks, policy checks, etc. Further, method 800 proceeds at 804, where encapsulation data that encapsulates the message is removed. Also, the method 800 proceeds at 806, where an integrity check is performed on the message. When an integrity check is performed on the message, a communication system may verify that a CRC is correct or verify the correctness of a digital signature that was appended to the message before transmission. In at least one further example, method proceeds at 808, where the message is processed when the message is verified through the integrity check. In certain implementations, the encapsulation data is removed and the message is checked with a firewall in a first partition on a processing unit and the integrity check is performed in a second partition on the processing unit.

EXAMPLE EMBODIMENTS

Example 1 includes a system for providing secure communications through a communication link, the system comprising: a first communication unit, the first communication unit comprising at least one processing unit that is configured to execute code that causes the first communication unit to: verify messages with a firewall as they are received by the first communication unit; remove encapsulation data that encapsulates a message received from a second communication unit; check a digital signature appended to the message received from a second communication unit through a non-secure communication link; perform an integrity check on the message; and when the message is verified through the digital signature and the integrity check, process the message; wherein removal of the encapsulation data and implementation of the firewall is in a first partition on the at least one processing unit and performance of the integrity check and verification of the digital signature is in a second partition on the at least one processing unit.

Example 2 includes the system of Example 1, wherein the first communication unit is avionics on an aircraft.

Example 3 includes the system of Example 2, wherein the first communication unit receives the message from a ground server, wherein the ground server receives the message from the second communication unit.

Example 4 includes the system of any of Examples 2-3, wherein the second communication system is an operations center.

Example 5 includes the system of any of Examples 1-4, wherein the first communication unit receives the message from the second communication unit through a broadband, IP based, air-ground communication link.

Example 6 includes the system of any of Examples 1-5, wherein the processing unit is further configured to execute code that scans the format of the message.

Example 7 includes the system of Example 6, wherein the processing unit is further configured to scan a format of the address of the message to determine what application processes the message.

Example 8 includes the system of any of Examples 1-7, wherein certain applications are restricted from executing on one of the first and second partitions.

Example 9 includes the system of any of Examples 1-8, wherein messages that are not associated with communications initiated by the first communication unit are filtered.

Example 10 includes a method for receiving secure communications through a communication link, the method comprising: checking a message with a firewall as the message is received from a second communication unit; removing encapsulation data that encapsulates the message received from a second communication unit; checking a digital signature appended to the message received from a second communication unit through the communication link; performing an integrity check on the message; and when the message is verified through the digital signature and the integrity check, processing the message; wherein the encapsulation data is removed and the message is checked with the firewall in a first partition and the verification of the digital signature and the integrity check is performed in a second partition.

Example 11 includes the method of any of Examples 9-10, wherein a format of the message is scanned and message validation check is performed.

Example 12 includes the method of any of Examples 9-11, wherein the communication link is a broadband, IP based, air-ground communication link.

Example 13 includes the method of any of Examples 9-12, wherein the integrity check comprises verifying a cyclical redundancy check appended to the message.

Example 14 includes the method of any of Examples 9-13, further comprising: appending a cyclical redundancy check to a second message; encapsulating the second message for transmission according to a transmission protocol; appending information to the second message according to the transmission protocol; and transmitting the second message through the communication link; wherein the second message is encapsulated in the second partition and the cyclical redundancy check is appended to the second message in the first partition.

Example 15 includes the method of Example 14, wherein transmitting the second message through the communication link comprises transmitting the second message through a ground server, wherein the ground server provides the message to the second communication unit.

Example 16 includes the method of any of Examples 9-15, wherein the second communication system is an operations center.

Example 17 includes the method of any of Examples 9-16, wherein certain applications are restricted from executing on one of the first and second partitions.

Example 18 includes a system for providing secure communications through a communication link, the system comprising: a first communication unit, the first communication unit comprising at least one first processing unit that is configured to execute code that causes the first communication unit to: append a cyclical redundancy check to a message; encapsulate the message for transmission according to a transmission protocol; append information to the message according to the transmission protocol; and transmit the message through a communication link; wherein the encapsulation data is appended in a second partition for the at least one second processing unit and the cyclical redundancy check is appended to the message in a first partition for the at least one second processing unit; and a second communication unit, the second communication unit comprising at least one second processing unit that is configured to execute code that causes the second communication unit to: remove encapsulation data that encapsulates the message received from the first communication unit; scan the format of the message; perform an integrity check on the message; and when the message is verified through the integrity check, process the message.

Example 19 includes the system of Example 18, wherein the code executed by the at least one second processing unit is further configured to cause the second communication unit to: append a second cyclical redundancy check to a second message; encapsulate the second message for transmission according to the transmission protocol; append further information to the second message according to the transmission protocol; and transmit the second message through the communication link; wherein the code executed by the at least one first processing unit is further configured to cause the first communication unit to: check the second message with a firewall as the second message is received from the second communication unit; remove additional encapsulation data that encapsulates the second message received from the first communication unit; scan the format of the second message; perform an integrity check on the second message; and when the second message is verified through the integrity check, process the second message.

Example 20 includes the system of any of Examples 18-19, wherein certain applications are restricted from executing on one of the first and second partitions.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

The invention claimed is:

1. A system for providing secure communications through an Internet Protocol (IP) communication link, the system comprising:
   a first communication unit, the first communication unit comprising at least one hardware processing unit that is configured to execute code that causes the first communication unit to:
      verify avionics messages with a firewall to filter received avionics messages as they are received by the first communication unit from a second communication unit;
      remove IP information with an IP network stack;
      remove encapsulation data that encapsulates the avionics messages;
      check a digital signature appended to the avionics messages;
      perform an integrity check on the avionics messages; and
      when the avionics messages are verified through the digital signature and the integrity check, process the avionics messages;
   wherein removal of the encapsulation data and implementation of the firewall and IP network stack are performed using resources associated with a first avionic partition on the at least one processing unit and performance of the integrity check and verification of the digital signature are performed using resources associated with a second avionic partition on the at least one processing unit, wherein the resources associated with the first avionic partition are separated from the resources associated with the second avionic partition.

2. The system of claim 1, wherein the first communication unit is avionics on an aircraft.

3. The system of claim 2, wherein the first communication unit receives the avionics messages from a ground server, wherein the ground server receives the avionics messages from the second communication unit.

4. The system of claim 2, wherein the second communication system is an operations center.

5. The system of claim 1, wherein the hardware processing unit is further configured to execute code that scans a format of the avionics messages.

6. The system of claim 5, wherein the hardware processing unit is further configured to scan a format of an address of the avionics messages to determine what application processes the avionics messages.

7. The system of claim 1, wherein one or more applications are restricted from executing on one of the first avionic partition on the at least one hardware processing unit and the second avionic partition on the at least one hardware processing unit.

8. The system of claim 1, wherein the firewall filters out the avionics messages when the avionics messages are not associated with communications initiated by the first communication unit.

9. A method for receiving secure communications through an Internet Protocol (IP) communication link on a first communication unit comprising at least one hardware processing unit, the method comprising:
   on the first communication unit, verifying an avionics message with a firewall as the avionics message is received by the first communication unit from a second communication unit via the IP communication link, wherein the firewall is configured to filter the receive avionics message;
   on the first communication unit, removing IP information with an IP network stack;
   on the first communication unit, removing encapsulation data that encapsulates the avionics message;
   on the first communication unit, checking a digital signature appended to the avionics message;
   on the first communication unit, performing an integrity check on the avionics message; and
   on the first communication unit, when the avionics message is verified through the digital signature and the integrity check, processing the avionics message;
   wherein removal of the encapsulation data and implementation of the firewall and the IP network stack are processed using resources associated with a first avionic partition on the at least one hardware processing unit and performance of a verification of the digital signature and the integrity check is processed using resources associated with a second avionic partition on the at least one processing unit, wherein the resources associated with the first avionic partition are separated from the resources associated with the second avionic partition.

10. The method of claim 9, wherein a format of the avionics message is scanned, and a message validation check is performed.

11. The method of claim 9, wherein the integrity check comprises verifying a cyclical redundancy check appended to the avionics message.

12. The method of claim 9, further comprising:
appending a cyclical redundancy check to a second avionics message;
encapsulating the second avionics message for transmission according to a transmission protocol;
appending information to the second avionics message according to the transmission protocol; and
transmitting the second avionics message through the communication link;
wherein the second avionics message is encapsulated in the second avionic partition, and the cyclical redundancy check is appended to the second avionics message in the first avionic partition.

13. The method of claim 12, wherein transmitting the second avionics message through the communication link comprises transmitting the second avionics message through a ground server, wherein the ground server provides the avionics message to the second communication unit.

14. The method of claim 9, wherein the second communication unit is an operations center.

15. The method of claim 9, wherein one or more applications are restricted from executing on one of the first and second avionic partitions.

16. A system for providing secure communications through an Internet Protocol (IP) communication link, the system comprising:
a first communication unit, the first communication unit comprising at least one first hardware processing unit that is configured to execute code that causes the first communication unit to:
append a cyclical redundancy check to an avionics message;
encapsulate the avionics message with encapsulation data for transmission according to a transmission protocol;
append IP information to the avionics message;
append a digital signature to the avionics message; and
transmit the avionics message through the IP communication link;
wherein the encapsulation data and IP information are appended using resources associated with a second avionic partition for the at least one first hardware processing unit and the cyclical redundancy check and digital signature are appended to the message using resources associated with a first avionic partition for the at least one first hardware processing unit and the first avionic partition and the second avionic partition are associated with different levels, wherein the resources associated with the first avionic partition on the at least one first hardware processing unit are separated from the resources associated with the second avionic partition on the at least one first hardware processing unit; and
a second communication unit, the second communication unit comprising at least one second hardware processing unit that is configured to execute code that causes the second communication unit to:
remove the IP information with an IP network stack;
remove encapsulation data that encapsulates the avionics message received from the first communication unit;
scan a format of the avionics message;
perform an integrity check on the avionics message;
verify the digital signature appended to the avionics message, wherein the removal of the encapsulation data and the IP information is performed using resources associated with a first avionic partition on the at least one second hardware processing unit and the performance of the integrity check and verification of the digital signature is done using resources associated with a second avionic partition on the at least one second hardware processing unit, wherein the resources associated with the first avionic partition on the at least one second hardware processing unit are separated from the resources associated with the second avionic partition on the at least one second hardware processing unit; and
when the avionics message is verified through the integrity check, process the avionics message.

17. The system of claim 16, wherein the code executed by the at least one second hardware processing unit is further configured to cause the second communication unit to:
append a second cyclical redundancy check to a second avionics message;
encapsulate the second avionics message for transmission according to the transmission protocol;
append further IP information to the second avionics message according to the transmission protocol; and
transmit the second avionics message through the communication link;
wherein the code executed by the at least one first hardware processing unit is further configured to cause the first communication unit to:
check the second avionics message with a firewall as the second avionics message is received from the second communication unit;
remove additional encapsulation data that encapsulates the second avionics message received from the second communication unit;
scan the format of the second avionics message;
perform an integrity check on the second avionics message; and
when the second avionics message is verified through the integrity check, process the second avionics message.

18. The system of claim 16, wherein one or more applications are restricted from executing on one of the first avionic partition on the at least one second hardware processing unit and the second avionic partition on the at least one second hardware processing unit.

* * * * *